UNITED STATES PATENT OFFICE.

JAMES P. CLARE, OF STRATHAM, NEW HAMPSHIRE.

SELF-HEALING COMPOSITION FOR THE INNER TUBES OF TIRES.

1,206,414. Specification of Letters Patent. Patented Nov. 28, 1916.

No Drawing. Application filed April 1, 1916. Serial No. 88,406.

*To all whom it may concern:*

Be it known that I, JAMES P. CLARE, of Stratham, in the county of Rockingham and State of New Hampshire, a citizen of the United States, have invented a new and useful Improvement in Self-Healing Compositions for the Inner Tubes of Tires, of which the following is a full, clear, and exact description, reference being had to the accompanying drawings, forming a part of this specification, in explaining its nature.

The present invention relates to a self-healing composition or filling for the inner tubes of tires, and constitutes an improvement upon the self-healing composition described in my Letters Patent of the United States No. 1,137,461, of April 27, 1915.

The object of my present invention, like the object of the invention of said patent, is to provide a self-healing composition which will perform the function for which it is designed and which will retain its character and usefulness during the life of the tube or tire.

It is my further object in the present connection to provide a composition of superior density and viscosity of body and one free from pores. In this connection I would explain that while the composition referred to in my said patent makes a superior product, entirely suitable for the purpose for which it was designed, yet I have noted that it is slightly porous. Such porosity is objectionable on account of the danger of oxidization by the pores permitting the entrance of air. From experiments I have found that the formation of pores is due to the presence of moisture in certain of the elements employed. This trapped moisture is converted into steam during the vulcanization of the tube, for it will be understood that the filling is placed in the tube before the tube is vulcanized, and it is the expanding steam which leaves the pores in the filling.

The present composition consists of a mixture of reclaimed rubber, a tar free from moisture such as pine tar and a softening agent free from moisture such as palm oil. These ingredients are the usual commercial products although I prefer to employ a reclaimed rubber which has been made as free as possible from all foreign substances and which has been ground exceedingly fine.

In preparing the composition I prefer to use the ingredients in about the following proportions, viz: ten pounds of reclaimed rubber, two pounds of tar and one pound of palm oil. I have, however, obtained excellent results by using but one pound of tar and one half a pound of palm oil to the ten pounds of reclaimed rubber. In fact, the proportions will depend largely upon the results desired to be obtained. The ingredients are mixed together in a common type of rubber mill having heated rolls.

My present composition has a dense, semi-plastic and semi-elastic consistency; it is exceedingly tacky and free from all pores, retaining these characteristics when heated in contact with rubber containing sulfur.

Having thus fully described my invention, I claim and desire to secure by Letters Patent of the United States:—

1. A self-healing composition for the inner tubes of tires comprising a mixture of reclaimed rubber, tar free from moisture and a softening agent free from moisture, said composition having a dense, semi-plastic and semi-elastic, tacky consistency and retaining these properties when heated in contact with rubber containing sulfur.

2. A self-healing composition for the inner tubes of tires comprising reclaimed rubber, pine tar and palm oil, the mixture having a dense, semi-plastic, semi-elastic, tacky consistency free from pores and retaining these properties when heated in contact with rubber containing sulfur.

JAMES P. CLARE.

Copies of this patent may be obtained for five cents each, by addressing the "Commissioner of Patents, Washington, D. C."